(12) United States Patent
Hasegawa

(10) Patent No.: US 6,215,880 B1
(45) Date of Patent: Apr. 10, 2001

(54) TWO-WIRE CONFERENCE APPARATUS WITH ECHO CANCELER WITHOUT TRAINING

(75) Inventor: Atsushi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/839,028

(22) Filed: Apr. 23, 1997

(30) Foreign Application Priority Data

Apr. 24, 1996 (JP) .................................................. 8-101762

(51) Int. Cl.⁷ ...................................................... H04B 3/20
(52) U.S. Cl. .............................................. 381/66; 379/406
(58) Field of Search .......................... 381/66, 71.1, 94.1, 381/73.1; 379/406, 410, 409, 390, 3, 411

(56) References Cited

U.S. PATENT DOCUMENTS

| | | | |
|---|---|---|---|
| 4,225,754 | * 9/1980 | Bernard et al. | 381/66 |
| 4,636,586 | * 1/1987 | Schiff | 381/66 |
| 5,050,160 | * 9/1991 | Fuda | 379/406 |
| 5,323,459 | * 6/1994 | Hirano | 381/66 |
| 5,577,097 | * 11/1996 | Meek | 379/406 |

FOREIGN PATENT DOCUMENTS

| | | |
|---|---|---|
| 0194738 | 9/1986 | (EP) . |
| 0604948 | 7/1994 | (EP) . |
| 0725527 A1 | 8/1996 | (EP) . |
| 0746134 | 12/1996 | (EP) . |
| 0769867 | 4/1997 | (EP) . |
| 2287626 | 9/1995 | (GB) . |
| 58-142641 | 8/1983 | (JP) . |
| 60-260235 | 12/1985 | (JP) . |
| 6104970 | 4/1994 | (JP) . |
| 8139647 | 5/1996 | (JP) . |

OTHER PUBLICATIONS

"New VoicePrint AEC–50," NEc Technical Journal, vol. 47, No. 11/1994, pp. 32–37.

* cited by examiner

Primary Examiner—Vivian Chang
(74) Attorney, Agent, or Firm—Sughrue, Mion, Zinn, Macpeak & Seas, PLLC

(57) ABSTRACT

An audio conference apparatus includes a microphone, a speaker, and a hybrid circuit for transmitting a signal and for receiving a signal. A first echo estimating section estimates a speaker output signal as a signal to be outputted from the speaker to supply a first echo cancellation quantity to the first subtracter. A first subtracter subtracts the first echo cancellation quantity from a microphone input signal as a signal to be outputted from the microphone to output a first subtracted signal. A first circuit section generates a signal, which is attenuated in response to a first attenuation instruction and amplified, from the first subtracted signal to output a transmission output signal to the hybrid circuit. A second echo estimating section estimates the transmission output signal to supply a second echo cancellation quantity to a second subtracter. The second subtracter subtracts the second echo cancellation quantity from the reception input signal to output a second subtracted signal. A second circuit section generates a signal, which is attenuated in response to a second attenuation instruction and amplified, from the second subtracted signal to output the generated signal as the speaker output signal to the speaker. A control section monitors various signals to control the first estimating section, the second estimating section, the first circuit section, and the second circuit section.

15 Claims, 10 Drawing Sheets

201/301/302

303/304

401/501

402/502

005/006

202/203/204

305

306

TWO-WIRE CONFERENCE APPARATUS WITH ECHO CANCELER WITHOUT TRAINING

BACKGROUND OF THE INVENTION

1. Field of the Invention

The present invention relates to a two-wire audio conference apparatus, and more particularly to a two-wire audio conference apparatus having a howling and echo prevention function of which are generated in a case where a speaker and a microphone are positioned near each other.

2. Description of Related Art

FIG. 1 is a block diagram of a conventional two-wire audio conference apparatus. In FIG. 1, an echo estimator 004 estimates an echo signal when a part of an output signal to a speaker 001, i.e., a speaker output signal, goes around to a microphone 002 side. This estimated echo signal is subtracted from an input signal supplied from the microphone 002, i.e., a microphone input signal, by a subtracter 003 such that echo is canceled.

On the other hand, an echo estimator 011 estimates an echo signal when a part of a transmission output signal to a hybrid circuit 009 goes around to a reception input signal from the hybrid circuit 009. This estimated echo signal is subtracted from the reception input signal by a subtracter 010 such that echo is canceled.

A training controller 020 starts training in response to a trigger from an external trigger unit 019. Training is performed to each of the echo estimators 004 and 011. White noise generated from noise generators 015 and 014 are selected by selector 016 and 013 which are controlled by the training controller 020 and are outputted to the speaker 001 and the hybrid circuit 009 along the signal transmission directions, respectively. The echo estimators 011 and 004 refer to these signals to estimate in such a manner that generated echoes are canceled, respectively.

After sufficient estimation is completed, the echo estimator 011 is controlled to stop the estimating operation. The estimation operation of the echo estimator 004 is controlled by a bi-directional talk detector 017 to be described later. Also, the selectors 016 and 013 are reset to the original communication enable states.

A suppressing unit 018 compares the level of the reception input signal from the hybrid circuit 009 with the level of the microphone input signal. The suppressing unit 018 applies a predetermined fixed suppression between an input and an output on the side of lower level, but does not apply any suppression to the side of higher level. For example, it is assumed that level comparison between signals to input terminals a and c of the suppressing circuit 018 is performed and the level of the signal to the input terminal a is higher than that of the signal to the input terminal c. In this case, a suppression is applied to the signal to the input terminal c and the suppression applied signal is outputted from an output terminal b of the suppressing circuit 018. On the contrary, any suppression is not applied to the signal to the input terminal a and the signal to the input terminal a is outputted from an output terminal d as it is. This suppression allows howling to be prevented and generation of remaining echo after the echo cancellation to be prevented.

In the estimating operation of the echo estimator 004 which processes echo on the acoustic side, the level of the output signal to the speaker 001 and the level of the input signal from the microphone 002 are compared by the bidirectional talk detector 017. When the microphone input signal level is lower than the speaker output signal level, control is performed to activate the estimating operation of the echo estimator 004.

An amplifier 007 amplifies and adjusts the transmission output signal to a line in level. An amplifier 012 amplifies and adjusts a signal to the speaker 001 in level.

A first problem of this training method is that it is necessary to generate a large level of noise in training. When there is a far end apparatus having the same structure, the processes of noise generation from the speaker and noise sending to the line must be executed twice. Also, in this method, there is a possibility that the training is erroneously performed in the near end apparatus when the far end apparatus performs the training at the same time. For instance, when a signal is inputted from the far end apparatus to the near end apparatus while the near end apparatus is being trained, the estimation result of the echo estimator 011 would include an error.

The second problem of the conventional technique is that the training process needs to be performed at the beginning of communication for estimation by an echo estimator. Also, it is desirable that the sound source used for the training is white noise and has a high level. For this reason, the high level of noise in the training is unpleasant to the people nearby. Also, in a case of erroneous training, howling sometimes is generated.

The third problem of the conventional technique is that there is sometimes a remaining echo after the echo cancellation because of insufficient suppression so that there is a case where an echo returns. As a result, an echo is amplified from the speaker of the far end apparatus, which can degrade communication quality degrade. This is a problem especially when the line delay is large.

SUMMARY OF THE INVENTION

An object of the present invention is to provide a method of accurately performing echo estimation without any training and a two-wire audio conference apparatus using the method.

Another object of the present invention is to provide a method of adaptively adjusting an attenuation quantity of a remaining echo such that high communication quality can be achieved and a two-wire audio conference apparatus for the same.

In order to achieve these objects an aspect of the present invention, a two-wire audio conference apparatus, includes a microphone, a speaker, a hybrid circuit for transmitting a transmission output signal inputted to its input terminal and for receiving a signal to output a reception input signal from its output terminal, a first subtracter connected to the microphone, a first echo estimating section responsive to a first activation control signal, for estimating a speaker output signal as a signal to be outputted from the speaker to supply a first echo cancellation quantity to the first subtracter, wherein the first subtracter subtracts the first echo cancellation quantity from a microphone input signal as a signal to be outputted from the microphone to output a first subtracted signal, a first circuit section provided between the first subtracter and the input terminal of the hybrid circuit, for generating a signal, which is attenuated in response to a first attenuation instruction and amplified with a predetermined amplification, from the first subtracted signal to output the generated signal as the transmission output signal to the hybrid circuit, a second subtracter connected to the output terminal of the hybrid circuit, a second echo estimating section responsive to a second activation control signal, for estimating the transmission output signal to supply a second echo cancellation quantity to the second subtracter, wherein the second subtracter subtracts the second echo cancellation quantity from the reception input signal to output a second subtracted signal, a second circuit section provided between the second subtracter and the speaker, for generating a signal, which is attenuated in response to a second attenuation instruction and amplified with a predetermined amplification, from the second subtracted signal to output the generated signal as the speaker output signal to the speaker, and a control section for monitoring the microphone input signal, the first subtracted signal, the transmission output signal, the reception input signal, the second subtracted signal and the speaker output signal, to output the first activation control signal to the first estimating section, the second activation control signal to the second estimating section, the first attenuation instruction to the first circuit section, and the second attenuation instruction to the second circuit section, based on the monitoring result.

In the control section, an averaging section averages the microphone input signal, the first subtracted signal, the transmission output signal, the reception input signal, the second subtracted signal and the speaker output signal based on predetermined time constants, respectively, to generate an average microphone input signal, an average first subtracted signal, an average transmission output signal, an average reception input signal, an average second subtracted signal and an average speaker output signal, and a control unit outputs the first activation control signal to the first estimating section, the second activation control signal to the second estimating section, the first attenuation instruction to the first circuit section, and the second attenuation instruction to the second circuit section, based on the average microphone input signal, the average first subtracted signal, the average transmission output signal, the average reception input signal, the average second subtracted signal and the average speaker output signal.

When the first and second circuit section include first and second attenuating circuits, respectively, the control section includes an attenuation quantity control section for monitoring the microphone input signal, the first subtracted signal, the transmission output signal, the reception input signal, the second subtracted signal and the speaker output signal to calculate first and second attenuation quantities, and for respectively outputting the first and second attenuation instructions to the first and second attenuating circuits at predetermined timings in accordance with the first and second attenuation quantities.

In this case, the control section further includes:
a first estimation operation control section for issuing the first activation control signal to the first estimating section based on the microphone input signal, the first subtracted signal, the speaker output signal and the first attenuation instruction, and a second estimation operation control section for issuing the second activation control signal to the second estimating section based on the transmission output signal, the reception input signal, the second subtracted signal and the second attenuation instruction.

The first estimation operation control section includes a first comparing and determining section for outputting a first signal when the speaker output signal is larger than a predetermined value, a second comparing and determining section for outputting a second signal when the first attenuation quantity is larger than a predetermined value, a first comparison processing section for comparing a signal corresponding to the microphone input signal and a signal corresponding to the first subtracted signal to calculate the first echo cancellation quantity by the first subtracting section, a third comparing and determining section for outputting a third signal when the first echo cancellation quantity is larger than a predetermined value, and a first logical determination section for outputting the first activation control signal to the first echo estimating section in accordance with the first to third signals. Also, the second estimation operation control section includes a fourth comparing and determining section for outputting a fourth signal when the transmission output signal is larger than a predetermined value, a fifth comparing and determining section for outputting a fifth signal when the second attenuation quantity is larger than a predetermined value, a second comparison processing section for comparing a signal corresponding to the reception input signal and a corresponding to the second subtracted signal to calculate the second echo cancellation quantity by the second subtracting section, a sixth comparing and determining section for outputting a sixth signal when the second echo cancellation quantity is larger than a predetermined value, and a second logical determination section for outputting the second activation control signal to the second echo estimating section in accordance with the fourth to sixth signals.

The attenuation quantity control section includes a third comparison processing section for comparing a corresponding to the microphone input signal and a signal corresponding to the speaker output signal, a fourth comparison processing section for comparing a signal corresponding to the reception input signal and a signal corresponding to the transmission output signal, an attenuation quantity changing section for determining a direction of communication based on the comparing results of the third and fourth comparison processing section and determining whether each of the first and second attenuation quantities should be increased or decreased, based on the comparing results of the third and fourth comparison processing section, a first comparing and estimating section for comparing a signal corresponding to the microphone input signal and a signal corresponding to the first subtracted signal to estimate the first echo cancellation quantity, a second comparing and estimating section for comparing a signal corresponding to the reception input signal and a signal corresponding to the second subtracted signal to estimate a second echo cancellation quantity, a maximum attenuation quantity calculating section for calculating a maximum attenuation quantity for each of the first and second attenuating circuits based on the first and second echo cancellation quantities, and an attenuation quantity calculating section for calculating the first and second attenuation quantities from the determining results of the attenuation quantity changing section and the calculating results of the maximum attenuation quantity calculating section to respectively issue the first and second attenuation instructions to the first and second attenuating circuits based on the first and second attenuation quantities.

Another aspect of the present invention, a two-wire audio apparatus, includes a first subtracter for subtracting a first echo cancellation quantity from a first input signal to generate a first subtracted signal, a first echo estimating section responsive to a first activation control signal, for estimating a second output signal, which is generated from a second subtracted signal, to supply the first echo cancellation quantity to the first subtracter, a second subtracter for subtracting a second echo cancellation quantity from a second input signal to generate a second subtracted signal, a second echo estimating section responsive to a second activation control signal, for estimating a first output signal, which is generated from the second subtracted signal, to supply a second echo cancellation quantity to the second subtracter, and a control section for monitoring the first input signal, the first subtracted signal, the first output signal, the second input signal, the second subtracted signal and the second output signal without training, to output the first activation control signal to the first estimating section, and the second activation control signal to the second estimating section, based on the monitoring result.

DESCRIPTION OF THE PREFERRED EMBODIMENTS

The audio conference apparatus of the present invention will be described below with reference to the accompanying drawings.

In the present invention, in a case where an indoor (acoustic) echo in a near end apparatus and a line echo are to be estimated and cancelled, signal levels are compared before and after echo cancellation such that the direction of communication is detected. This detection result is referred to, and when the level of a remaining echo signal is comparatively high, one or both of echo estimators are controlled to activate an estimating operation. Based on this control, the echo estimator performs the estimation with proper timing and can prevent the generation of echo of the linear signal.

In the control of the attenuation quantity of the remaining echo signal, an echo cancellation quantity is monitored and a total attenuation quantity is controlled to maintain a howling margin of the whole system. Therefore, in the echo un-canceled state at the beginning of communication, comparatively large attenuation is applied to prevent howling, and as the echo cancellation progresses, the attenuation quantity is decreased.

First, the audio conference apparatus according to the first embodiment of the present invention will be described. FIGS. 2 to 5 are block diagrams illustrating the audio conference apparatus according to the first embodiment of the present invention.

Figure 1:
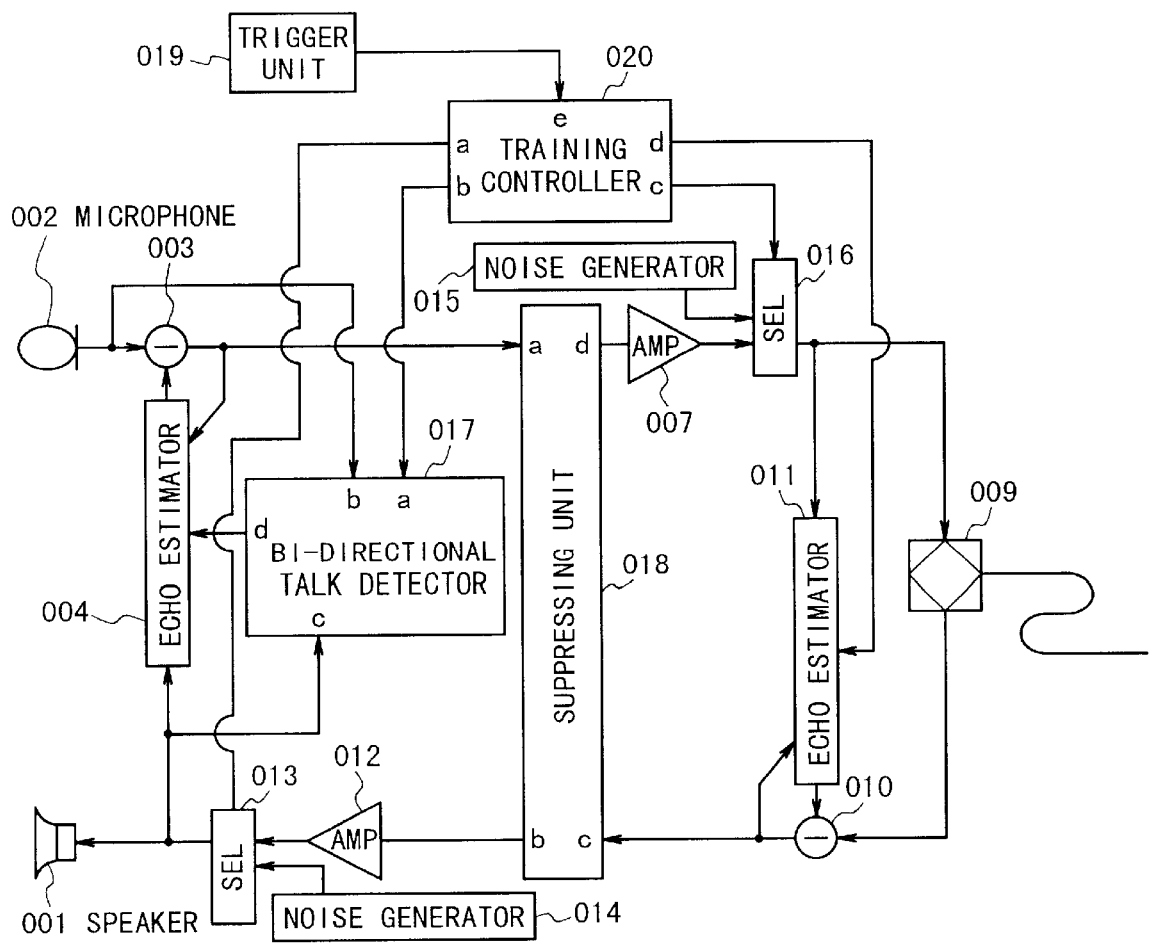
FIG. 1 is a block diagram illustrating the structure of an example of a conventional two-wire audio conference apparatus.
Figure 2:
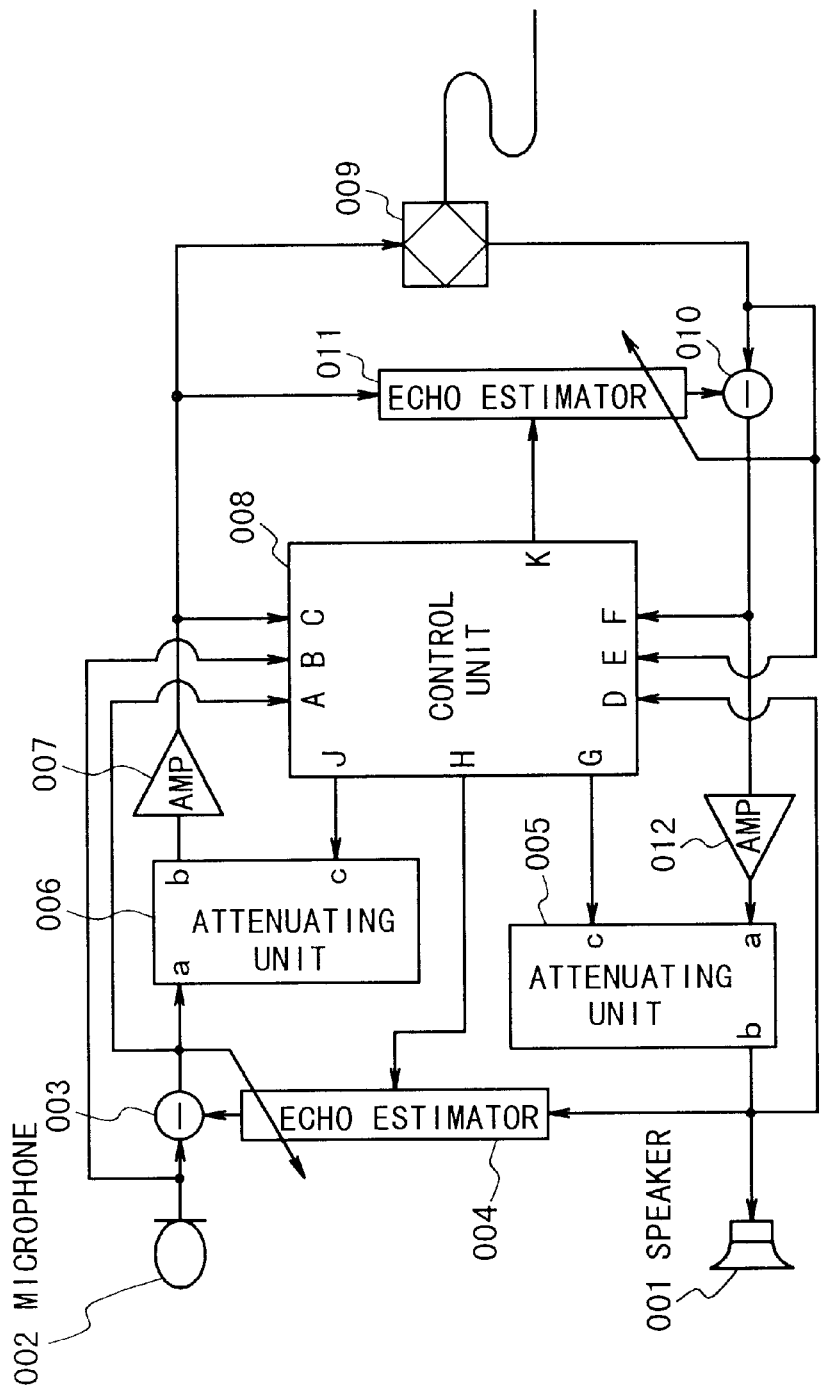
FIG. 2 is a block diagram illustrating the whole structure of a two-wire audio conference apparatus according to an embodiment of the present invention.

First, referring to FIG. 2, an echo estimator 004 estimates echo which is generated on an acoustic (indoors) side (echo generated when a part of an output signal to the speaker 001, i.e., a speaker output signal, goes around to a microphone 002 side; acoustic echo). The subtracter 003 subtracts quasi-echo which is generated by the echo estimator 004, from an input signal supplied from the microphone 002, i.e., a microphone input signal, to cancel the echo.

An echo estimator ol estimates echo which is generated on the line side (reflection in the hybrid circuit 009, or echo generated when a part of a signal outputted from a hybrid circuit 009, a transmission output signal, goes around to a reception input signal by the hybrid circuit 009; line echo). A subtracter 010 subtracts quasi-echo which is generated by the echo estimator 011, from a reception input signal supplied from the hybrid circuit to cancel the echo.

An attenuating unit 006 is connected to the output of the subtracter 003 and attenuates a remaining echo which is left after the echo cancellation by the echo estimator 0004. An amplifier 007 is connected to the output of the attenuating unit 006 and amplifies the level of an input signal to a predetermined level which is necessary to send out this amplified output to the line. The connection order of the attenuating unit 006 and the amplifier 007 may be inverse.

An amplifier 012 is connected to the output of the subtracter 010 and amplifies the level of an input signal to a predetermined level which is necessary to output the amplified output to the speaker 001. An attenuating unit 005 is connected to the output of the amplifier 012 and attenuates a remaining echo which is left after the echo cancellation by the echo estimator 011. The connection order of the attenuating unit 005 and the amplifier 012 may be inverse.

A control unit 008 receives the microphone input signal before the subtracter 003, a subtracted signal after the subtracter 003, the transmission output signal amplified by the amplifier 007, the reception input signal before the subtracter 010, a subtracted signal after the subtracter 010, and the speaker output signal after the attenuating unit 005 at input terminals A, B, C, F, E, and D, respectively. The control unit 008 integrally or collectively controls the estimating operations of the two echo estimators 004 and 011 and the attenuation quantities by the two attenuating units 005 and 006 based on the received signals.

Figure 3:
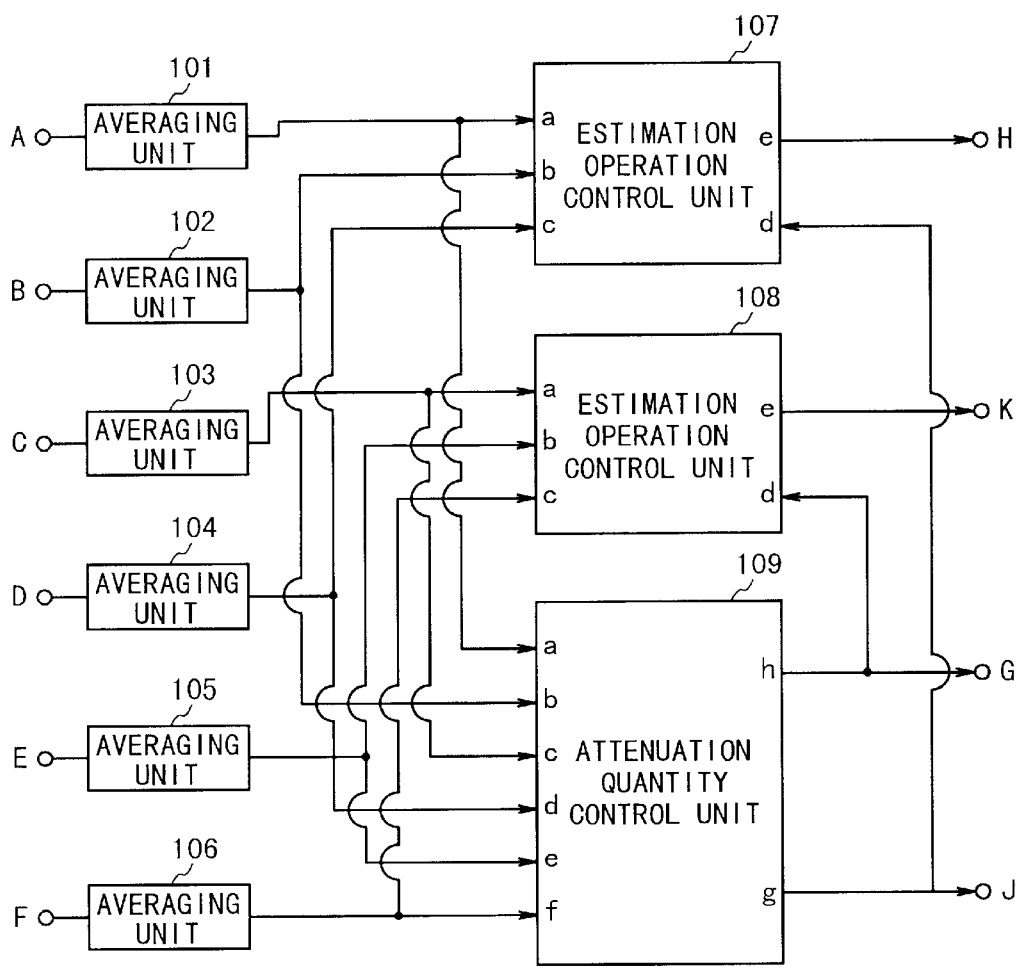
FIG. 3 is a block diagram illustrating the structure of an example of a control unit 008 shown in FIG. 2 in the two-wire audio conference apparatus of the present invention.

FIG. 3 is a block diagram illustrating the structure of the control unit 008 in detail. Averaging units 101 to 106 average the signals received at the input terminal A to F with predetermined time constants, respectively.

An estimation operation control unit 107 controls the echo estimator 004 on the acoustic side based on an average value d of a speaker output signal (a reference signal) to the input terminal D, i.e., an average speaker output signal d (the same as to other signals), an average microphone input signal b to the input terminal B, an average subtracter output signal a from the subtracter 003 (the remaining echo signal) to the input terminal A and the attenuation quantity by the attenuating unit 006 which is the output of an attenuation quantity control unit 109.

An estimation operation control unit 108 controls the echo estimator 011 on the line side based on an average transmission output signal c (the reference signal) to the hybrid circuit 009 which is received at the input terminal C, an average reception input signal e of the hybrid circuit 009 which is received at the input terminal E, an average output signal f of the subtracter 010 (the remaining echo signal) to the input terminal F and the attenuation quantity by the attenuating unit 005 which is the output of the attenuation quantity control unit 109.

The attenuation quantity control unit 109 determines the attenuation quantities of the two attenuating units 005 and 006 from the average values of the signals to the input terminals A to F.

Figure 4:
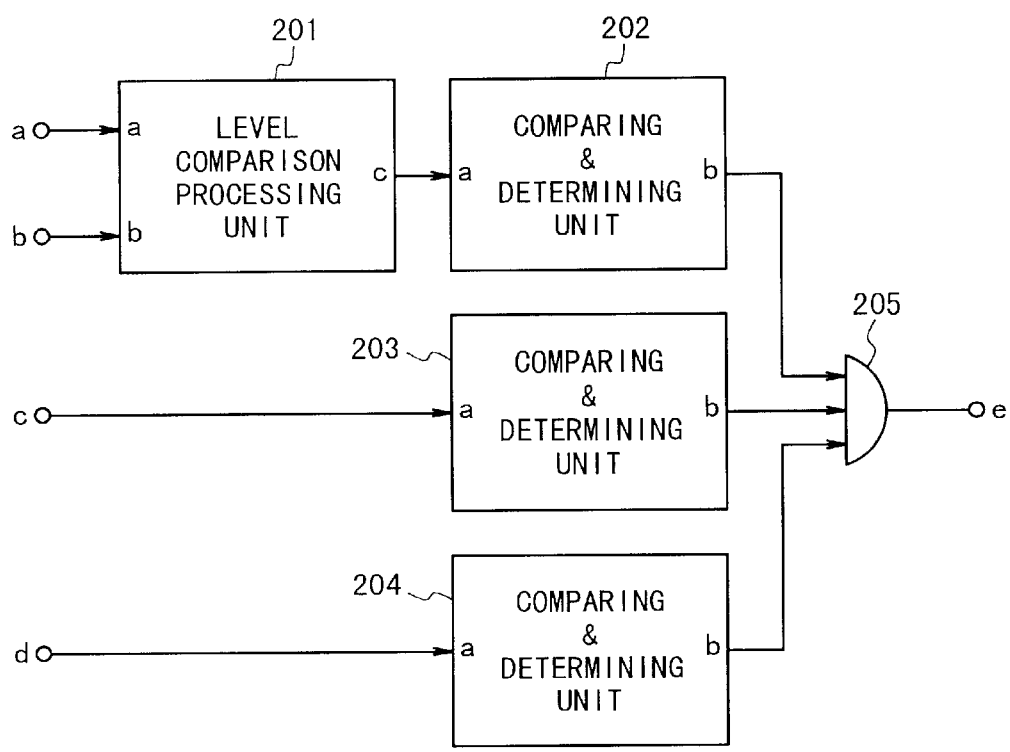
FIG. 4 is a block diagram illustrating the structure of an example of each of estimating operation control units 107 and 108 shown in FIG. 3 in the two-wire audio conference apparatus of the present invention.

FIG. 4 is a block diagram illustrating each of the estimation operation control units 107 and 108 shown in FIG. 3 in detail. In the figure, signal terminals a to e in FIG. 3 represent the signal terminals written in the block of the estimation operation control unit 107 or 108 shown in FIG. 3, and a similar reference scheme is applied to other figures.

A level comparison processing unit 201 monitors the average signals a and b before and after the echo cancellation by the subtracter 003 or the average value signals e and f before and after the echo cancellation by the subtracter 010 and performs a comparing process. A comparing and determining unit 202 determines the processing result of the comparison processing unit 201. Comparing and determining units 203 and 204 respective receive the average reference signals (the average transmission output signal c to the hybrid circuit 009 on the line side, and the average speaker output signal d of FIG. 2 on the acoustic side, (i.e., the average signals of the signals outputted from the attenuating units 005 and 006) and compare the received average signals with predetermined threshold values, respectively.

An AND gate 205 generates a logic product of the outputs of the comparing and determining units 202, 203 and 204 to output a control determination result of the estimating operation.

Figure 5:
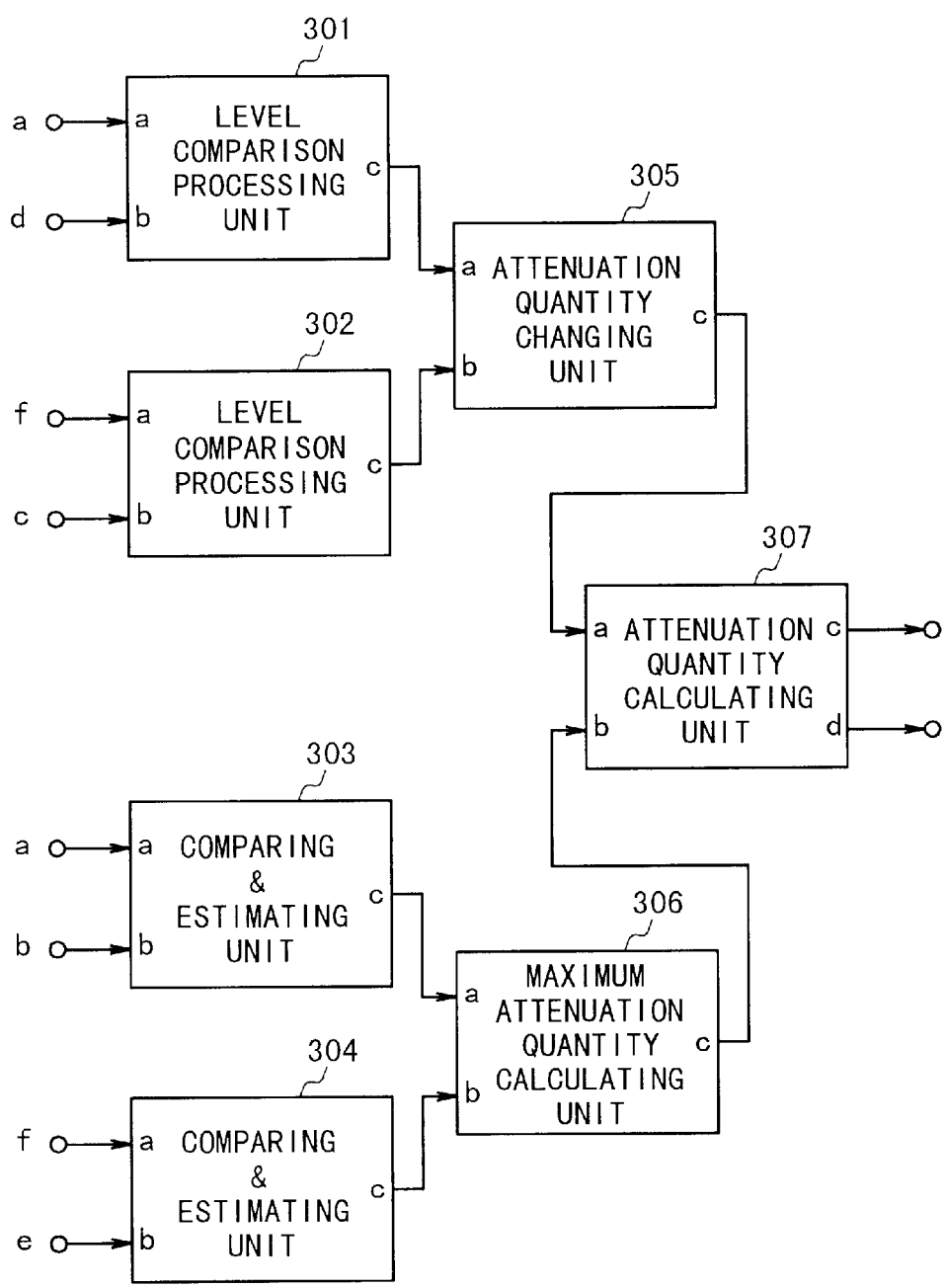
FIG. 5 is a block diagram illustrating the structure of an example of an attenuation quantity control unit 109 shown in FIG. 3 in the two-wire audio conference apparatus of the present invention.

FIG. 5 is a block diagram illustrating the structure of the attenuation quantity control unit 109 shown in FIG. 3 in detail. A level comparison processing unit 301 compares the signal level of the average speaker output signal d and the average remaining echo signal a which is the output of the subtracter 003. A level comparison processing unit 302 compares the signal level of the average transmission output signal c to the hybrid circuit 009 and the average remaining echo signal f which is the output of the subtracter 010. An attenuation quantity changing unit 305 determines the communication direction and the increase or decrease of the attenuation quantity based on the outputs of the level comparison processing units 301 and 302.

A comparing and estimating unit 303 compares the signal level of the average microphone input signal b and the average remaining echo signal a, and a comparing and estimating unit 304 compares the signal level of the average reception input signal e from the hybrid circuit 009 and the average remaining echo signal f. Thus, the echo cancellation quantities are estimated by the units 303 and 304, respectively. A maximum attenuation quantity calculating unit 306 calculates the maximum attenuation quantity when the howling margin of the whole system is maintained, based on the outputs of the two comparing and estimating units 303 and 304.

An attenuation quantity calculating unit 307 calculates necessary attenuation quantities to the two attenuating units 005 and 006 based on the output of the attenuation quantity changing unit 305 and the output of the maximum attenuation quantity calculation unit and outputs the calculated attenuation quantities to the two attenuating units 005 and 006.

Next, the operation of the audio conference apparatus shown in FIG. 2 will be described. When communication begins (an initialization state), the echo estimator 004 on the acoustic side and the echo estimator 011 on the line side are in the state in which the estimation of the echo path is not performed. The estimation of the echo path is performed based on a communication speech signal.

Speech generated on the near end apparatus is received by the microphone 002. The speech signal is transferred as a transmission output signal from microphone 002 to the transmission input terminal of the hybrid circuit 009 to be transferred to the far end apparatus. Meanwhile, the subtracter 003 and the attenuating unit 006 do not change the passing transmission output signal. The amplifier 007 performs a predetermined amplifying operation to amplify the transmission output signal to an appropriate level for transmission to the far end apparatus.

The transmission output signal transferred to the hybrid circuit is transmitted to the 2-wire line. At the same time, the transmission output signal is electrically reflected from the hybrid circuit 009 because of impedance mismatching to generate echo on the side of the reception input of the hybrid circuit 009. This echo is referred to as line echo. The line echo includes as a component echo generated by a different hybrid circuit which is on the line side, in addition to the echo generated by the hybrid circuit 009. When this echo is outputted from the speaker 001 without being canceled or being attenuated, the microphone 002 collects sound, which becomes one of causes of howling.

The echo estimator 011 refers to the transmission output signal to the hybrid circuit 009 in response to an activation control instruction from the control unit 008 to generate a quasi-echo. Then, the quasi-echo is subtracted from a reception input signal from the hybrid circuit 009 by the subtracter 010. The estimation is performed such that the remaining echo approaches zero.

If the remaining echo is amplified by the amplifier 012 and is outputted from the speaker 001, the communication does not only become difficult but also the remaining echo goes around from the microphone input again to return as the reference signal of the echo estimator 011. This functions as not only interference to the echo estimation but also becomes one of causes of erroneous estimation. Therefore, the remaining echo should be attenuated by the attenuating unit 005 so as not to be output from the speaker.

On the contrary, the speech signal of a speaking person at the far end apparatus end is inputted from the reception input of the hybrid circuit 009 and is transferred to the speaker 001. In this case, each operation is the same as the case of the microphone input from the near end apparatus. However, the echo is generated by the electric reflection of the hybrid circuit 009 while the above-mentioned echo from the speaker 001 to the microphone 002 is acoustic.

Referring to FIG. 3, the operation of the control unit 008 of FIG. 2 will be described. The averaging units 101 to 106 average the signals on the predetermined points with respect to time with predetermined time constants, respectively. The estimation operation control unit 107 determines time when the echo estimator 004 on the acoustic side starts the estimation. For this purpose, the estimation operation control unit 107 monitors the average speaker output signal d, compares the average signals b and a before and after the subtracter 003 of FIG. 2, and monitors the attenuation quantity of the attenuating unit 006.

The estimation operation control unit 108 determines the time when the echo estimator 011 on the line side starts the estimation. For this purpose, the estimation operation control unit 108 monitors the average transmission output signal c to the hybrid circuit 009, compares the average signals e and f before and after the subtracter 010 of FIG. 2, and monitors the attenuation quantity of the attenuating unit 005. The attenuation quantity control unit 109 calculates the maximum attenuation quantity from the average signals of the respective points and controls the attenuation attenuation quantity instruction output to the attenuating units 005 and 006 of FIG. 2 based on the calculated result.

Referring to FIG. 4, the operations of the estimating operation control units 107 and 108 of FIG. 3 will be described. The input terminals a and b of each of the estimating operation control units 107 and 108 are supplied with the average signals a and b or f and e after and before the echo cancellation, respectively. The comparison value of these average signals is equivalent to the cancellation quantity. This comparison value is a large value (for example, 30 dB) during echo cancellation. In a case where the average signal level is small, or in a case where a signal of an opposite direction to the echo cancellation (interrupt signal) is inputted, it is a small value (for example, 0 dB).

The level comparison processing unit 201 averages comparatively large comparison values among the above-mentioned comparison values, e.g., the comparison values larger than a threshold value. Then, based on this average comparison value, the comparison processing unit 201 normalizes and outputs a current comparison value. This normalized comparison value is compared with a predetermined value by the comparing and determining unit 202. When this normalized comparison value is larger than the predetermined value, the comparing and determining unit 202 adds a protection time to output "1". In other words, the estimation of the cancellation quantity is performed. When the current comparison value (the current cancellation quantity) is near or larger than the estimated value, the comparing and determining unit 202 determines that there is little possibility that interrupt speech has been inputted.

Also, the comparing and determining unit 203 monitors the average reference signal of the echo estimator 011 or 004 based on the average signal c or d. The comparing and determining unit 203 adds a protection time under the condition that there is a signal level, to output "1". Then, the comparing and determining unit 204 monitors the attenuation quantity of each of the attenuating units 005 and 006 based on the average signal d or c. The estimating operation control unit 107 or 108 monitors the attenuation quantity of the attenuating unit 006 or 005 and adds a protection time under the condition of sufficient attenuation of echo, to output "1". A logic product is generated by the AND gate 205 from the outputs of these comparing and determining units 202, 203 and 204. The echo estimator 011 or 004 is activated when "1" is outputted from the AND gate 205.

Referring to FIG. 5, the operation of the attenuation quantity control unit 109 of FIG. 3 will be described. The comparison processing unit 301 provides information when monitoring a speech signal of a speaking person in the near end apparatus. Also, the comparison processing unit 302 provides information when monitoring a speech signal of a speaking person in the far end apparatus.

The input terminals a and b of each of the level comparison processing units 301 and 302 are supplied with the average signals a and f after the echo cancellation and the reference signals d and c of the echo estimator 011 or 004, respectively. That is, on the acoustic side, they are the average output signal a of the subtracter 003 and the average speaker output signal d. On the acoustic side, the comparison of these two average signals a and d contributes to detection of the speech signal of the speaking person in the near end apparatus. On the line side, they are the average output signal f of the subtracter 010 and the average transmission output level c of the hybrid circuit 009. On the line side, the comparison of these two average signals f and c contributes to the detection of the speech signal of the speaking person in the far end apparatus.

The processing on the acoustic side, i.e., the processing of the comparison processing unit 301 will be described in detail. When the speaking person in the far end apparatus talks and the speaking person in the near end apparatus is silent, the comparison value between the average signals a and d supplied to the input terminals a and b indicates the value obtained by adding the echo attenuation quantity and the echo cancellation quantity on the acoustic side between the speaker 001 and the microphone 002. This value is averaged and determined as the estimated value of the level comparison.

This estimated value can be determined by averaging comparatively large values among the comparison values between the average signals supplied to the input terminals a and b which shows various values in the communication state. The averaging may be performed by comparing each of the comparison values with a predetermined value.

The comparison processing unit 301 normalizes the comparison value between the average signals supplied to the input terminals a and b which indicate various values in the communication state, based on this averaged estimated value, and outputs the normalized comparison value. Also, the comparison processing unit 302 performs the same operation.

The attenuation quantity changing unit 305 monitors the normalized comparison values from the comparison processing units 301 and 302 to determine the direction of the communication. The adjustment of attenuation quantity is performed based on this determination. In order to facilitate the monitor of the interrupt from each speaking person (on the near end apparatus side or far end apparatus side), the determining condition of the normalized comparison values from the comparison processing units 301 and 302 is changed on the interrupt from each other. For example, while a signal from the speaking person in the far end apparatus is inputted, the interrupt from the speaking person in the near end apparatus is monitored based on the normalized comparison value outputted from the comparison processing unit 301. When the generation of the interrupt is determined (the speaking person changes from the far end apparatus side to the near end apparatus side), an interrupt from the speaking person in the far end apparatus is monitored based on the output of the comparison processing unit 302. An instruction indicative of increase or decrease of the attenuation quantity is outputted based on this determination.

The comparing and estimating units 303 and 304 estimate the degrees (the echo cancellation quantities) of the echo estimation by the respective echo estimators 004 and 011 shown in FIG. 2 based on the comparison values before and after the echo cancellation by the subtracters 003 and 010 shown in FIG. 2, respectively The comparison values are large during the echo cancellation. When the signal level is small, or when a signal (the interrupt signal) in the direction opposite to the echo cancellation is inputted, the comparison values are small. Each of the comparing and estimating units 303 and 304 averages comparatively large values among the comparison values and outputs the average comparison value. This averaging may be performed by comparing each comparison value with a predetermined value.

The maximum attenuation quantity calculating unit 306 calculates an optimal attenuation quantity from the outputs of the comparing and estimating units 303 and 304, taking the howling margin of whole system into account. For example, in a case where the echo estimators 004 and 011 are not performing echo estimation, the maximum attenuation quantity is large to attenuate the remaining echo. On the other hand, when the estimation is completed, the maximum attenuation quantity is made small to improve the bi-directional communication characteristics.

The attenuation quantity calculating unit 307 determines the attenuation quantity to instruct each of the attenuating units 005 and 006 shown in FIG. 2 based on the output of the attenuation quantity changing unit 305 and the output of the maximum attenuation quantity calculating unit.

Figure 6:
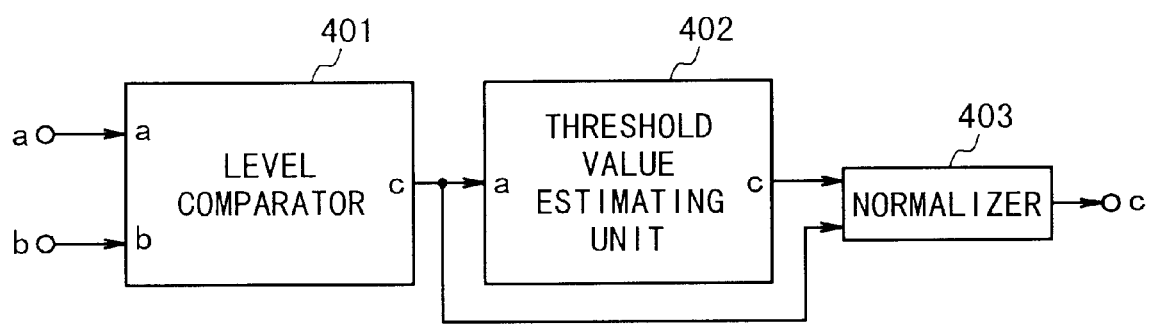
FIG. 6 is a block diagram illustrating the structure of an example of each of level comparison processing units 201, 301 and 302 in FIGS. 4 and 5 in the two-wire audio conference apparatus of the present invention shown.

A specific example of each of the circuit blocks will be described below. FIG. 6 shows the structure of the level comparison processing units 201, 301 and 302. A level comparator 401 compares signals at input terminals a and b with each other. The comparing result (a/b) is shown in a [dB] unit. A threshold value estimating unit 402 averages relatively large values among the outputs of the level comparator 401. This average value is referred to as a maximum average of the comparison values. A normalizing unit 403 normalizes the comparison values as the output of the level comparator 401 based on the maximum average of the comparison values as the output of the threshold value estimating unit 402. That is, the following calculating equation (1) is performed.

(Comparison value)/(maximum average of comparison values) (1)

This result is outputted. As the result is near "1", the comparison value is in the state near the maximum value of the comparison values.

For example, if this normalized comparison values are considered to correspond to the echo cancellation quantity, the normalized comparison value near "1" indicates the state in which echo cancellation is stable and the normalized comparison value near "0" indicates the state in which there is not a signal or there is an interrupt input. This value quantitatively indicates the result by suppressing or attenuating, to a minimum value, the influence of the changing state (increase or decrease of the cancellation quantity through the echo estimation) and the changing level (increase or decrease of the speech level by the communication speech).

Figure 7:
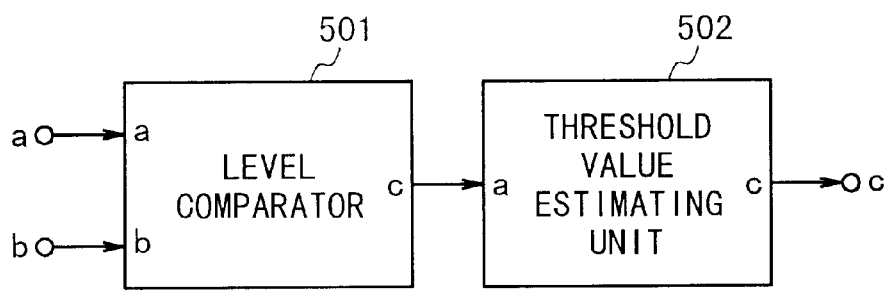
FIG. 7 is a block diagram illustrating the structure of an example of each of comparing and estimating units 303 and 304 shown in FIG. 5 in the two-wire audio conference apparatus of the present invention.

FIG. 7 shows the structure of each of the comparing and estimating units 303 and 304. Each of the comparing and estimating units is composed of a level comparator 501 and a threshold value estimating unit 502. Each is the same as a corresponding unit of the level comparator 401 and the threshold value estimating unit 402 of the above-mentioned comparison processing unit 301 or 302. The output of the threshold value estimating unit 502 is referred to as the maximum average of the comparison values. For example, when the comparison objects are the signal levels before and after the subtracters 003 and 010 shown in FIG. 2, the maximum average is equivalent to the echo cancellation quantity.

Figure 8:
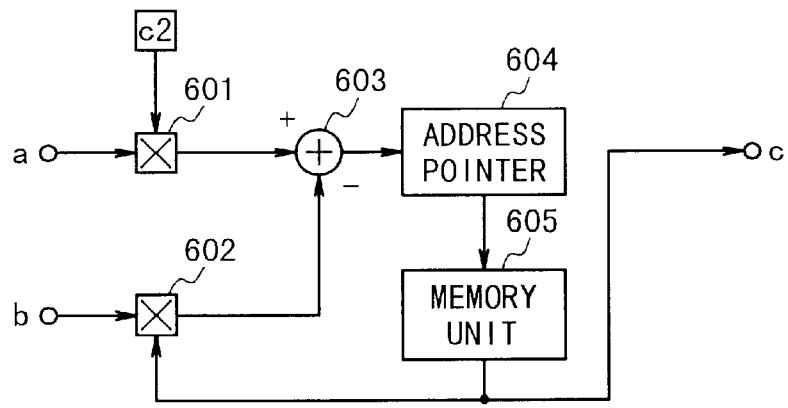
FIG. 8 is a block diagram illustrating the structure of an example of each of level comparators 401 and 501 shown in FIGS. 6 and 7 in the two-wire audio conference apparatus of the present invention.

FIG. 8 shows the example of each of the level comparators 401 and 501. A bias $c_2$ is given to the signal level of the input a by a multiplier 601. A value from the memory unit 605 which is addressed by an address pointer 604 is multiplied by the signal level of the input b the multiplier 602. For example, the data which provides attenuation by the multiplication, e.g., (1 dB to 50 dB in a 1-dB unit for all addresses 1 to 50) are stored in the memory unit 605. The value of the above-mentioned bias $c_2$ provides, for example, 12-dB attenuation by the multiplication.

Now, when the address pointer 604 indicates 32, a subtracter 603 subtracts a signal obtained by attenuating the input b by 32 dB from a signal obtained by attenuating the input a by 12 dB. If the result is a negative, "1" is added to the address pointer. If the result is positive, "1" is subtracted from the address pointer.

In this manner, the position of the address pointer 604 is changed incrementally such that the outputs of the respective multipliers become equal. In this example, the output of this address pointer 604, the attenuation quantity supplied from the bias $c_2$ and the level comparison value are indicated in a dB unit.

Figure 9:
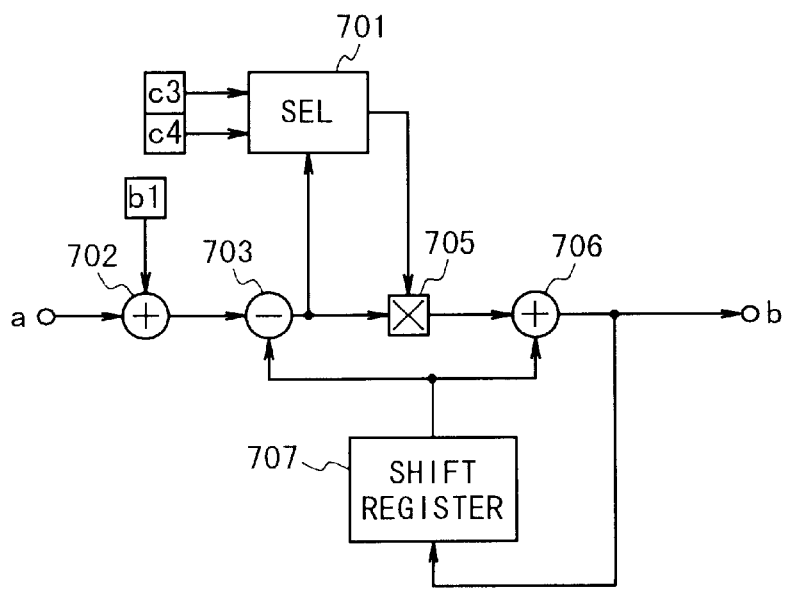
FIG. 9 is a block diagram illustrating the structure of an example of each of threshold value estimating units 402 and 502 shown in FIGS. 6 and 7 in the two-wire audio conference apparatus of the present invention.

FIG. 9 shows an example of each of the threshold value estimating units 402 and 502. In this example, the threshold value is a value obtained by averaging the values of the input signal with relatively large power. For example, when values of the input signal are in a range of 1 to 30 dB, the threshold value estimating unit inputs this signal to determine a value of about 30 dB as an estimated value. The subtracter 703 subtracts the estimated value (the output of a shift register 707) from a value of signal to the input a. A selector 701 selects a constant value $c_3$ when the output of the subtracter 703 is positive and a constant value $c_4$ when it is negative.

A multiplier 705 multiplies the output of the subtracter 703 by the selected constant value. An adder 706 adds the estimated value to the output of the multiplier 705 and outputs this result as the latest estimated value. The shift register 707 stores the latest estimated value for the next processing. The values of $c_3$ and $c_4$ satisfy the following equation (2).

$$0 < c_3 < 1, \ 0 < c_4 < 1, \ c_3 >> c_4 \qquad (2)$$

Based on these values, when a value of the input signal is larger than the estimated value, the estimated value is increased rapidly, and when it is smaller than the estimated value, the estimated value is decreased slowly.

Figure 10:
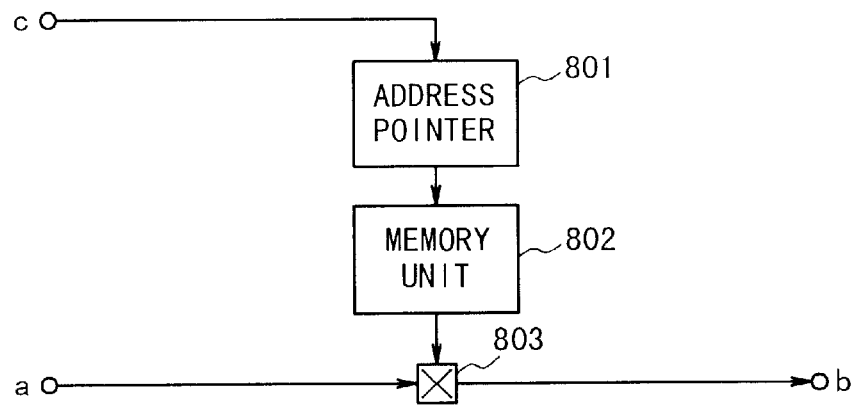
FIG. 10 is a block diagram illustrating the structure of an example of each of attenuation units 005 and 006 shown in FIG. 2 in the two-wire audio conference apparatus of the present invention.

FIG. 10 shows a block diagram of each of the attenuating units 005 and 006 shown in FIG. 2. An address pointer 801 specifies the address in which the attenuation data instructed by the attenuation quantity control unit 109 shown in FIG. 3 is stored. An memory unit 802 stores the value which is necessary for each attenuation and outputs data stored in the address which is specified by the address pointer 801. For example, the attenuation quantities of 0 dB to 30 dB are stored at increments of 1 dB. A multiplier 803 multiplies the signal to the input a by the output of the memory unit 802 to accomplish predetermined attenuation.

Figure 11:
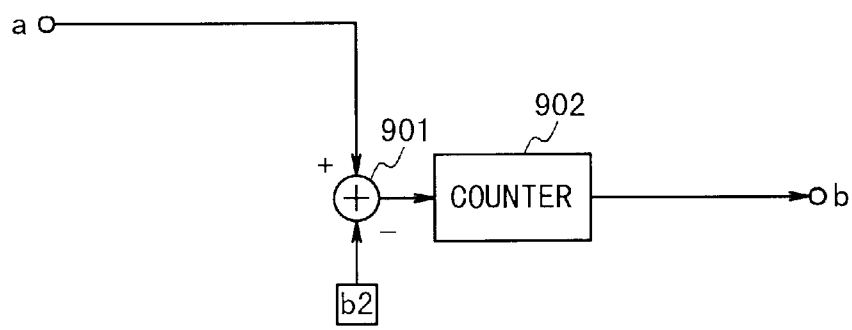
FIG. 11 is a block diagram illustrating the structure of an example of each of comparing and determining units 202, 203 and 204 shown in FIG. 4 in the two-wire audio conference apparatus of the present invention.

FIG. 11 is a block diagram of the comparing and determining units 202, 203 and 204 of FIG. 4. A subtracter 901 subtracts the constant value b2 which matches to each object from a signal to the input a. When the subtracting result is positive, a counter 902 is increased, and when negative, the counter 902 is decreased. When the value of the counter 902 does not reach some predetermined value, the counter 902 outputs "0".

Figure 12:
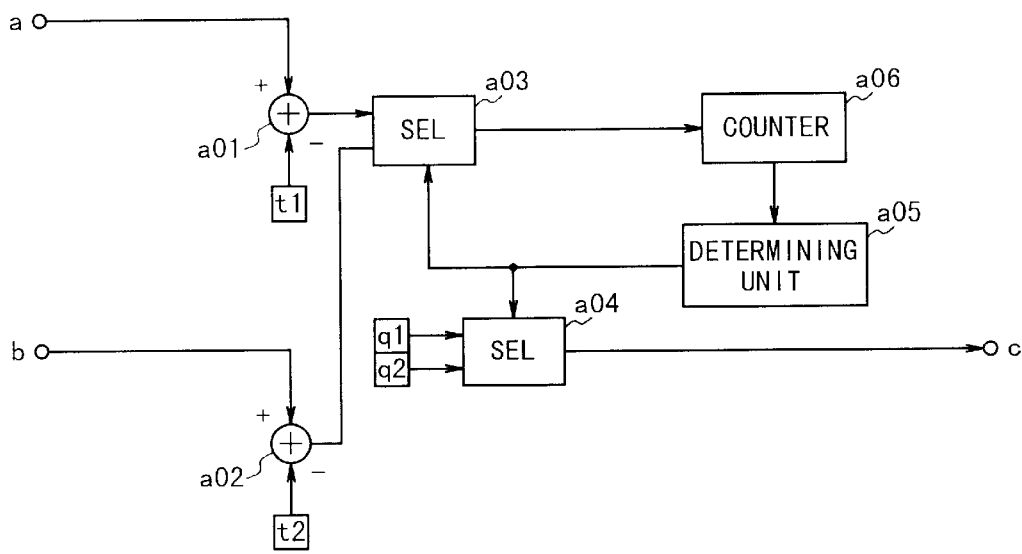
FIG. 12 is a block diagram illustrating the structure of an example of an attenuation quantity changing unit 305 shown in FIG. 5 in the two-wire audio conference apparatus of the present invention.

FIG. 12 is a block diagram of the attenuation quantity changing unit 305. The attenuation quantity changing unit 305 instructs a change quantity of the attenuation quantity to be given to the attenuating unit 006 shown in FIG. 2. A signal to an input a is the output of the comparison processing unit 301 which compares a speaker output signal level on the acoustic side and a signal level after the cancellation. A signal to an input b is the output of the comparison processing unit 302 which compares a transmission output level on the line side and a signal level after the cancellation. Subtracters a01 and a02 subtract threshold values t1 and t2 which are adaptive for the signals to the inputs a and b, from the values of the inputs a and b, respectively. A selector a03 is controlled in accordance with an instruction to increase or decrease the attenuation which is the output of a determining unit a05.

When the determining unit a05 instructs a increase of the attenuation, the selector a03 selects the output of the subtracter a01 based on the signal of the input a which is a comparison value on the acoustic side. On the other hand, when the determining unit a05 instructs a decrease of the attenuation, the selector a03 selects the output of the subtracter a02 based on the signal to the input b which is a comparison value on the line side.

A counter a06 counts up when the input signal is negative. The determining unit a05 monitors the counter output, and when the counter output exceeds some value, the determining unit a05 inverts the instruction to increase or decrease of the attenuation to output the inverted instruction to the selector a03. A selector a04 selects, based on the output of the determining unit a05, q1 which is a positive value when the attenuation quantity is increased and selects q2 which is a negative value when the attenuation quantity is decreased.

Figure 13:
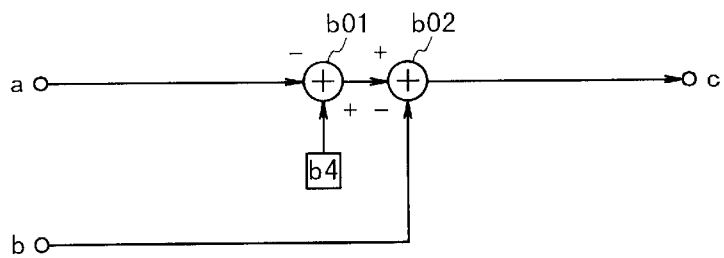
FIG. 13 is a block diagram illustrating the structure of an example of a maximum attenuation quantity calculating unit 306 shown in FIG. 5 in the two-wire audio conference apparatus of the present invention.

FIG. 13 is a block diagram of the maximum attenuation quantity calculating unit 306 shown in FIG. 5. The maximum attenuation quantity calculating unit 306 calculates the attenuation quantity with the system howling margin maintained from the estimated value of each of the echo cancellation quantities which are determined by the above-mentioned comparing and estimating units 303 and 304.

A subtracter b01 subtracts an estimated value of the echo cancellation quantity on the acoustic side from a predetermined value b4. A subtracter b02 subtracts an estimated value of the echo cancellation quantity on the line side from the output of the subtracter b01 and calculates and outputs the attenuation quantity which is required for maintaining the howling margin of the system.

Figure 14:
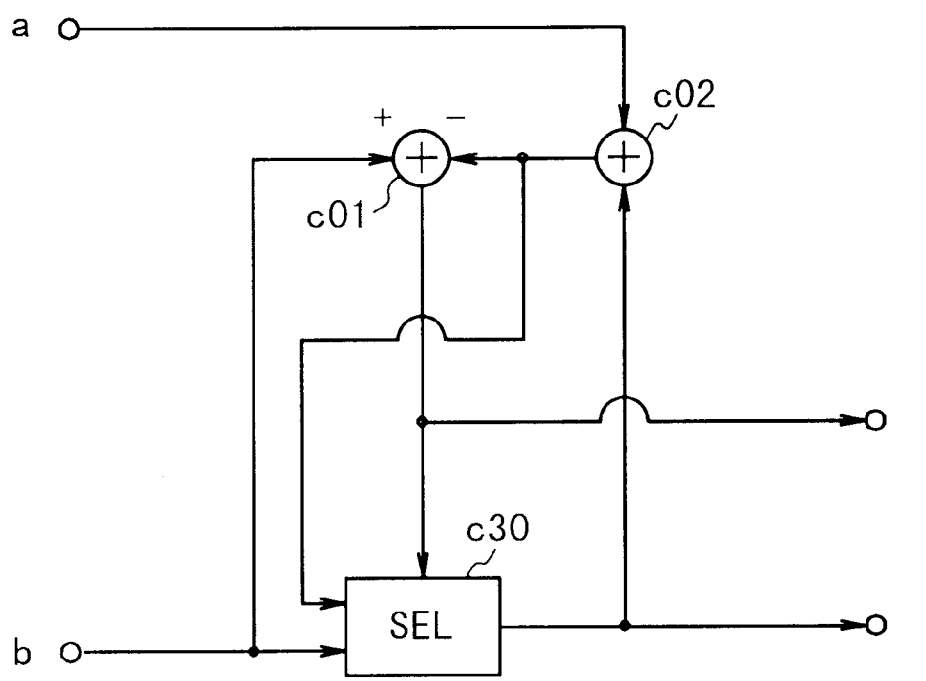
FIG. 14 is a block diagram illustrating the structure of an example of an attenuation quantity calculating unit 307 shown in FIG. 5 in the two-wire audio conference apparatus of the present invention.

FIG. 14 shows a block diagram of the attenuation quantity calculating unit 307 shown in FIG. 5. The attenuation quantity calculating unit 307 calculates the attenuation quantity to be instructed to the attenuating units 005 and 006 which are shown in FIG. 2, from the output of the above-mentioned attenuation quantity changing unit 305 and the output of maximum attenuation quantity calculation unit 306.

An adder c02 adds the change quantity from the attenuation quantity changing unit 305 to the attenuation quantity which is currently instructed to the attenuating unit 006. A subtracter c01 subtracts the output of the adder c02 from the output of the maximum attenuation quantity calculating unit 306 and instructs the attenuating unit 005 the result as the attenuation quantity. A selector c03 selects a signal to an input b which is a maximum attenuation quantity when the output of the subtracter c01 is negative, and selects the output of the adder c02 when the output of the subtracter c01 is positive. The selector c03 outputs the selected value as the attenuation quantity to the attenuating unit 006.

According to the present invention, the estimations of echo cancelers on the acoustic side and the line side can be accurately performed. Also, prevention of howling because of erroneous echo estimation and abridgment of the echo estimation time can be made possible. Therefore, it not necessary to perform the conventional training.

Also, when a signal with strong linearity is inputted to provide an echo estimation interrupt, the echo estimation can be completely stopped by monitoring the attenuation quantity of the remaining echo.

Also, according to the present invention, the howling margin in a closed loop is secured by imposing the attenuation which is adaptive to the echo cancellation quantity of the echo canceler. Further, it becomes possible to prevent the return of echo by accurately attenuating the remaining echo. As a result, there is an effect that it becomes possible to attenuate an echo and thus improve the communication quality.

What is claimed is:

1. A two-wire audio conference apparatus, comprising:

a microphone;

a speaker;

a hybrid circuit for transmitting a transmission output signal inputted to its input terminal and for receiving a signal to output a reception input signal from its output terminal;

a first subtracter connected to said microphone;

first echo estimating means responsive to a first activation control signal, for estimating a speaker output signal as a signal to be outputted from said speaker to supply a first echo cancellation quantity to said first subtracter, wherein said first subtracter subtracts said first echo cancellation quantity from a microphone input signal as a signal to be outputted from said microphone to output a first subtracted signal;

first circuit means provided between said first subtracter and the input terminal of said hybrid circuit, for generating a signal, which is attenuated in response to a first attenuation instruction and amplified with a predetermined amplification, from the first subtracted signal to output the generated signal as the transmission output signal to said hybrid circuit;

a second subtracter connected to the output terminal of said hybrid circuit;

second echo estimating means responsive to a second activation control signal, for estimating said transmission output signal to supply a second echo cancellation quantity to said second subtracter, wherein said second subtracter subtracts said second echo cancellation quantity from the reception input signal to output a second subtracted signal;

second circuit means provided between said second subtracter and said speaker, for generating a signal, which is attenuated in response to a second attenuation instruction and amplified with a predetermined amplification, from the second subtracted signal to output the generated signal as the speaker output signal to said speaker; and control means for monitoring said microphone input signal, said first subtracted signal, said transmission output signal, said reception input signal, said second subtracted signal and said speaker output signal, to output said first activation control signal to said first estimating means, said second activation control signal to said second estimating means, said first attenuation instruction to said first circuit means, and said second attenuation instruction to said second circuit means, based on the monitoring result.

2. A two-wire audio conference apparatus according to claim 1, wherein said control means includes:

averaging means for averaging said microphone input signal, said first subtracted signal, said transmission output signal, said reception input signal, said second subtracted signal and said speaker output signal based on predetermined time constants, respectively, to generate an average microphone input signal, an average first subtracted signal, an average transmission output signal, an average reception input signal, an average second subtracted signal and an average speaker output signal; and a control unit for outputting said first activation control signal to said first estimating means, said second activation control signal to said second estimating means, said first attenuation instruction to said first circuit means, and said second attenuation instruction to said second circuit means, based on said average microphone input signal, said average first subtracted signal, said average transmission output signal, said average reception input signal, said average second subtracted signal and said average speaker output signal.

3. A two-wire audio conference apparatus according to claim 1, wherein said first and second circuit means include first and second attenuating circuits, respectively, and wherein said control means includes:

attenuation quantity control means for monitoring said microphone input signal, said first subtracted signal, said transmission output signal, said reception input signal, said second subtracted signal and said speaker output signal to calculate first and second attenuation quantities, and for respectively outputting said first and second attenuation instructions to said first and second attenuating circuits at predetermined timings in accordance with the first and second attenuation quantities.

4. A two-wire audio conference apparatus according to claim 3, wherein said control means further includes:

first estimation operation control means for issuing said first activation control signal to said first estimating means based on said microphone input signal, said first subtracted signal, said speaker output signal and said first attenuation instruction; and second estimation operation control means for issuing said second activation control signal to said second estimating means based on said transmission output signal, said reception input signal, said second subtracted signal and said second attenuation instruction.

5. A two-wire audio conference apparatus according to claim 4, wherein said first estimation operation control means includes:

first comparing and determining means for outputting a first signal when said speaker output signal is larger than a predetermined value;

second comparing and determining means for outputting a second signal when said first attenuation quantity is larger than a predetermined value;

first comparison processing means for comparing a signal corresponding to said microphone input signal and a signal corresponding to said first subtracted signal to calculate said first echo cancellation quantity by said first subtracting means;

third comparing and determining means for outputting a third signal when said first echo cancellation quantity is larger than a predetermined value; and first logical determination means for outputting said first activation control signal to said first echo estimating means in accordance with said first to third signals.

6. A two-wire audio conference apparatus according to claim 4, wherein said second estimation operation control means includes:

fourth comparing and determining means for outputting a fourth signal when said transmission output signal is larger than a predetermined value;

fifth comparing and determining means for outputting a fifth signal when said second attenuation quantity is larger than a predetermined value;

second comparison processing means for comparing a signal corresponding to said reception input signal and a signal corresponding to said second subtracted signal to calculate said second echo cancellation quantity by said second subtracting means;

sixth comparing and determining means for outputting a sixth signal when said second echo cancellation quantity is larger than a predetermined value; and second logical determination means for outputting said second activation control signal to said second echo estimating means in accordance with said fourth to sixth signals.

7. A two-wire audio conference apparatus according to claim 3, wherein said attenuation quantity control means includes:

third comparison processing means for comparing a signal corresponding to said microphone input signal and a signal corresponding to said speaker output signal;

fourth comparison processing means for comparing a signal corresponding to said reception input signal and a signal corresponding to said transmission output signal;

attenuation quantity changing means for determining a direction of communication based on the comparing results of said third and fourth comparison processing means and determining whether each of said first and second attenuation quantities should be increased or decreased, based on the comparing results of said third and fourth comparison processing means;

first comparing and estimating means for comparing a signal corresponding to said microphone input signal and a signal corresponding to said first subtracted signal to estimate said first echo cancellation quantity; and second comparing and estimating means for comparing a signal corresponding to said reception input signal and a signal corresponding to said second subtracted signal to estimate a second echo cancellation quantity;

maximum attenuation quantity calculating means for calculating a maximum attenuation quantity for each of said first and second attenuating circuits based on said first and second echo cancellation quantities; and attenuation quantity calculating means for calculating said first and second attenuation quantities from the determining results of said attenuation quantity changing means and the calculating results of said maximum attenuation quantity calculating means to respectively issue said first and second attenuation instructions to said first and second attenuating circuits based on said first and second attenuation quantities.

8. A two-wire audio apparatus, comprising:

a first subtracter for subtracting a first echo cancellation quantity from a first input signal to generate a first subtracted signal;

first echo estimating means responsive to a first activation control signal, for estimating a second output signal which is generated from a second subtracted signal, to supply said first echo cancellation quantity to said first subtracter;

a second subtracter for subtracting a second echo cancellation quantity from a second input signal to generate said second subtracted signal;

second echo estimating means responsive to a second activation control signal, for estimating a first output signal which is generated from said first subtracted signal, to supply a second echo cancellation quantity to said second subtracter; and control means for monitoring said first input signal, said first subtracted signal, said first output signal, said second input signal, said second subtracted signal and said second output signal without training, to output said first activation control signal to said first estimating means, and said second activation control signal to said second estimating means, based on the monitoring result, wherein said control means includes:

averaging means for averaging said first input signal, said first subtracted signal, said first output signal, said second input signal, said second subtracted signal and said second output signal based on predetermined time constants, respectively, to generate an average first input signal, an average first subtracted signal, an average first output signal, an average second input signal, an average second subtracted signal and an average second output signal; and a control unit for monitoring said average first input signal, said average first subtracted signal, said average first output signal, said average second input signal, said average second subtracted signal and said average second output signal, and for outputting said first activation control signal to said first estimating means, and said second activation control signal to said second estimating means, based on the monitoring result.

9. A two-wire audio apparatus according to claim 8, wherein said control unit includes:

first estimation operation control means for issuing said first activation control signal to said first estimating means based on said average first input signal, said average first subtracted signal, and said average second output signal; and second estimation operation control means for issuing said second activation control signal to said second estimating means based on said average first output signal, said average second input signal, and said average second subtracted signal.

10. A two-wire audio apparatus according to claim 9, wherein said first estimation operation control means includes:

first comparing and determining means for outputting a first signal when said average second output signal is larger than a predetermined value;

first comparison processing means for comparing said average first input signal and said average first subtracted signal to calculate said first echo cancellation quantity by said first subtracting means;

second comparing and determining means for outputting a second signal when said first echo cancellation quantity is larger than a predetermined value; and first logical determination means for outputting said first activation control signal to said first echo estimating means in accordance with said first and second signals, and wherein said second estimation operation control means includes:

third comparing and determining means for outputting a third signal when said average first output signal is larger than a predetermined value;

second comparison processing means for comparing said average second input signal and said average second subtracted signal to calculate said second echo cancellation quantity by said second subtracting means;

fourth comparing and determining means for outputting a fourth signal when said second echo cancellation quantity is larger than a predetermined value; and second logical determination means for outputting said second activation control signal to said second echo estimating means in accordance with said third and fourth signals.

11. A two-wire audio apparatus according to claim 8, further comprising:

first circuit means for generating said second output signal from said first subtracted signal in response to a first attenuation instruction; and second circuit means for generating said first output signal from said second subtracted signal in response to a second attenuation instruction.

12. A two-wire audio apparatus according to claim 11, wherein said first and second circuit means include first and second attenuating circuits, respectively, and wherein said control unit further includes:

attenuation quantity control means for monitoring said average first input signal, said average first subtracted signal, said average first output signal, said average second input signal, said average second subtracted signal and said average second output signal to calculate first and second attenuation quantities, and for respectively outputting said first and second attenuation instructions to said first and second attenuating circuits at predetermined timings in accordance with the first and second attenuation quantities.

13. A two-wire audio apparatus according to claim 12, wherein said attenuation quantity control means includes:

third comparison processing means for comparing said average first input signal and said average second output signal;

fourth comparison processing means for comparing said average second input signal and said first output signal;

attenuation quantity changing means for determining a direction of communication based on the comparing results of said third and fourth comparison processing means and determining whether each of said first and second attenuation quantities should be increased or decreased, based on the comparing results of said third and fourth comparison processing means;

first comparing and estimating means for comparing said average first input signal and said average first subtracted signal to estimate said first echo cancellation quantity; and second comparing and estimating means for comparing said average second input signal and said average second subtracted signal to estimate said second echo cancellation quantity;

maximum attenuation quantity calculating means for calculating a maximum attenuation quantity for each of said first and second attenuating circuits based on said first and second echo cancellation quantities; and attenuation quantity calculating means for calculating said first and second attenuation quantities from the determining results of said attenuation quantity changing means and the calculating results of said maximum attenuation quantity calculating means to respectively issue said first and second attenuation instructions to said first and second attenuating circuits based on said first and second attenuation quantities.

14. A two-wire audio apparatus, comprising:

a first subtracter for subtracting a first echo cancellation quantity from a first input signal to generate a first subtracted signal;

first echo estimating means responsive to a first activation control signal, for estimating a second output signal which is generated from a second subtracted signal, to supply said first echo cancellation quantity to said first subtracter;

a second subtracter for subtracting a second echo cancellation quantity from a second input signal to generate said second subtracted signal;

second echo estimating means responsive to a second activation control signal, for estimating a first output signal which is generated from said first subtracted signal, to supply a second echo cancellation quantity to said second subtracter; and control means for monitoring said first input signal, said first subtracted signal, said first output signal, said second input signal, said second subtracted signal and said second output signal without training, to output said first activation control signal to said first estimating means, and said second activation control signal to said second estimating means, based on the monitoring result;

first circuit means for generating said first output signal from said first subtracted signal in response to a first attenuation instruction; and second circuit means for generating said second output signal from said second subtracted signal in response to a second attenuation instruction, wherein said first and second circuit means include first and second attenuating circuits, respectively; and wherein said control means further includes:

attenuation quantity control means for determining said first and second attenuation quantities based on the monitoring result of said first input signals, said first subtracted signal, said first output signal, said second input signal, said second subtracted signal and said second output signal without training, and respectively outputting said first and second attenuation instructions to said first and second attenuating circuits at predetermined timings in accordance with said first and second attenuation quantities, wherein said attenuation quantity control means includes:

changing means for determining whether each of said first and second attenuation quantities should be increased or decreased, based on said first input signal, said first output signal, said second input signal, and said second output signal;

maximum attenuation quantity calculating means for calculating a maximum attenuation quantity for each of said first and second attenuating circuits based on said first and second echo cancellation quantities; and attenuation quantity calculating means for calculating said first and second attenuation quantities from the determining results of said attenuation quantity changing means and the calculating results of said maximum attenuation quantity calculating means to respectively issue said first and second attenuation instructions to said first and second attenuating circuits based on said first and second attenuation quantities.

15. A two-wire audio apparatus, comprising:

a first subtracter for subtracting a first echo cancellation quantity from a first input signal to generate a first subtracted signal;

first echo estimating means responsive to a first activation control signal, for estimating a second output signal which is generated from a second subtracted signal, to supply said first echo cancellation quantity to said first subtracter;

a second subtracter for subtracting a second echo cancellation quantity from a second input signal to generate said second subtracted signal;

second echo estimating means responsive to a second activation control signal, for estimating a first output signal which is generated from said first subtracted signal, to supply a second echo cancellation quantity to said second subtracter; and control means for monitoring said first input signal, said first subtracted signal, said first output signal, said second input signal, said second subtracted signal and said second output signal without training, to output said first activation control signal to said first estimating means, and said second activation control signal to said second estimating means, based on the monitoring results;

first circuit means for generating said first output signal from said first subtracted signal in response to a first attenuation instruction; and second circuit means for generating said second output signal from said second subtracted signal in response to a second attenuation instruction, wherein said first and second circuit means include first and second attenuating circuits, respectively, and wherein said control means further includes:

attenuation quantity control means for determining said first and second attenuation quantities based on the monitoring result of said first input signals, said first subtracted signal, said first output signal, said second input signal, said second subtracted signal and said second output signal without training, and respectively outputting said first and second attenuation instructions to said first and second attenuating circuits at predetermined timings in accordance with said first and second attenuation quantities;

first estimation operation control means for issuing said first activation control signal to said first estimating means based on said first input signal, said first subtracted signal, said second output signal, and said first attenuation quantity; and second estimation operation control means for issuing said second activation control signal to said second estimating means based on said first output signal, said second input signal, said second subtracted signal, and said second attenuation quantity.

* * * * *